United States Patent
Verma et al.

(10) Patent No.: US 11,616,882 B2
(45) Date of Patent: Mar. 28, 2023

(54) ACCELERATING PRE-PRODUCTION FEATURE USAGE

(71) Applicant: Microsoft Technology Licensing, LLC, Redmond, WA (US)

(72) Inventors: Nidhi Verma, Redmond, WA (US); Andrei Nicolae, Bellevue, WA (US); Rahul Nigam, Bothell, WA (US); Parminder Pal Singh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 262 days.

(21) Appl. No.: 16/881,700

(22) Filed: May 22, 2020

(65) Prior Publication Data

US 2021/0368045 A1    Nov. 25, 2021

(51) Int. Cl.
*G06F 21/00* (2013.01)
*H04M 3/523* (2006.01)
(Continued)

(52) U.S. Cl.
CPC ............ *H04M 3/5232* (2013.01); *G06F 8/65* (2013.01); *G06F 11/3438* (2013.01);
(Continued)

(58) Field of Classification Search
None
See application file for complete search history.

(56) References Cited

U.S. PATENT DOCUMENTS

| 6,523,166 B1 * | 2/2003 | Mishra | G06F 8/61 |
| | | | 707/999.107 |
| 7,560,120 B2 * | 7/2009 | Shukla | A61K 9/0024 |
| | | | 424/423 |

(Continued)

OTHER PUBLICATIONS

Gunalp, Ozan Necati, "Continuous Deployment of Pervasive Applications in Dynamic Environments", Retrieved From: https://tel.archives-ouvertes.fr/tel-01215029/document, Nov. 13, 2014, 272 Pages.

(Continued)

*Primary Examiner* — Maung T Lwin

(57) ABSTRACT

Traditionally, when a feature is updated or a new feature is released, the feature undergoes internal testing and validation before external distribution. However, some features may receive proportionately less internal usage than customer usage reflected externally. Low internal usage of features can lead to weak telemetry data, which can allow code regressions (e.g., bugs) to go undetected until the features are released to customers. Accordingly, accelerated internal feature usage is provided to mirror external customer usage. Highly used features are dynamically identified and, any deficiencies in internal feature usage are identified. Tenant sites estimated to generate at least a portion of the deficiency in feature usage are identified. These sites may be migrated or replicated to internal validation rings to generate additional internal feature usage. By increasing internal testing and validation, the stability and reliability of feature releases are increased, thereby improving customer experience and satisfaction with the software product.

17 Claims, 8 Drawing Sheets

(51) Int. Cl.
- *G06F 16/2457* (2019.01)
- *G06Q 10/02* (2012.01)
- *G06Q 30/02* (2023.01)
- *H04M 3/51* (2006.01)
- *G06F 8/65* (2018.01)
- *G06F 11/34* (2006.01)

(52) U.S. Cl.
CPC ....... *G06F 16/24578* (2019.01); *G06Q 10/02* (2013.01); *G06Q 30/02* (2013.01); *H04M 3/5166* (2013.01)

(56) References Cited

U.S. PATENT DOCUMENTS

| | | | | |
|---|---|---|---|---|
| 7,742,939 | B1* | 6/2010 | Pham | G06F 8/77 |
| | | | | 705/7.39 |
| 7,937,281 | B2* | 5/2011 | Miller | G06Q 10/0631 |
| | | | | 705/7.12 |
| 8,356,278 | B2* | 1/2013 | Drissi | G06F 8/36 |
| | | | | 717/102 |
| 8,689,188 | B2* | 4/2014 | Bassin | G06F 11/3672 |
| | | | | 717/124 |
| 8,713,513 | B2* | 4/2014 | Sarkar | G06F 11/3616 |
| | | | | 705/7.38 |
| 8,806,014 | B2* | 8/2014 | Carter | G06F 8/60 |
| | | | | 709/224 |
| 9,983,982 | B1* | 5/2018 | Kumar | G06F 11/3664 |
| 10,459,828 | B2 | 10/2019 | Seibert et al. | |
| 10,467,128 | B2 | 11/2019 | Conti et al. | |
| 11,500,761 | B1* | 11/2022 | Arguelles | G06F 11/302 |
| 2005/0251432 | A1* | 11/2005 | Barker | G06Q 30/0201 |
| | | | | 705/7.41 |
| 2008/0027738 | A1* | 1/2008 | Friedrichowitz | G06Q 30/016 |
| | | | | 705/346 |
| 2008/0034347 | A1* | 2/2008 | V | G06F 8/70 |
| | | | | 717/101 |
| 2008/0209016 | A1* | 8/2008 | Karve | H04L 67/34 |
| | | | | 709/221 |
| 2010/0205027 | A1* | 8/2010 | Draper, Jr. | G09B 7/02 |
| | | | | 705/326 |
| 2013/0346163 | A1* | 12/2013 | Kemmer | G06Q 10/20 |
| | | | | 705/7.41 |
| 2015/0268975 | A1* | 9/2015 | Du | G06F 11/3664 |
| | | | | 703/23 |
| 2017/0286080 | A1 | 10/2017 | Krishnamoorthy et al. | |
| 2017/0374165 | A1 | 12/2017 | Lazar et al. | |
| 2018/0210817 | A1* | 7/2018 | Kelly | G06F 16/252 |
| 2020/0034518 | A1 | 1/2020 | Mezzalira | |

OTHER PUBLICATIONS

Jiang, et al., "Optimization Technique on Logistic Economy for Cloud Computing using Finite-Source Queuing Systems", In Proceedings of the IEEE International Conference on Cloud Computing Technology and Science, Dec. 3, 2012, pp. 827-832.

Khazaei, et al., "Modelling of Cloud Computing Centers using M/G/m Queues", In Proceedings of the International Conference on Distributed Computing Systems Workshops, Jun. 20, 2011, pp. 87-92.

"International Search Report and Written Opinion Issued in PCT Application No. PCT/US2021/022865", dated Jul. 16, 2021, 14 Pages.

Application as Filed in U.S. Appl. No. 16/425,683, filed May 29, 2019, 75 Pages.

Schonning, Nick, "Phase the Roll-Out of Your Application Through Rings", Retrieved from: https://github.com/ALM-Rangers/Guidance/blob/master/src/DevOps/phase-rollout-with-rings.md, Retrieved on Apr. 20, 2020, 11 Pages.

Semick, Jim, "Better Metrics for New Products", Retrieved from: https://www.pragmaticinstitute.com/resources/articles/better-metrics-for-new-products, Retrieved on Apr. 20, 2020, 4 Pages.

Xia, et al., "Safe Velocity: A Practical Guide to Software Deployment at Scale using Controlled Rollout", In Proceedings of IEEE/ACM 41st International Conference on Software Engineering: Software Engineering in Practice, May 25, 2019, 10 Pages.

* cited by examiner

ACCELERATING PRE-PRODUCTION FEATURE USAGE

BACKGROUND

Use of a cloud computing environment for software products and services has become popular for both individual consumers and enterprises. The cloud computing environment involves a distributed set of resources, including memory, processing units, and data storage communicatively interconnected via a secured network. This way, a service provider enables customers to seamlessly and dynamically scale up or scale down usage by continually assessing and reallocating resources among servers hosting the tenants. End users of the customers may use productivity tools (e.g., features) of the application services to upload files, share files, and perform other operations, such as collaborate on tasks. Traditionally, when features are updated or new features are released, the features undergo "ring level validation," which refers to deploying features to internal rings (or "dogfood rings") for testing and validation before distributing the features to external rings (e.g., or "production rings"). In this way, a new or updated feature is distributed to at least some internal users associated with the software provider (e.g., dogfood ring(s)) in order to ensure that the feature is performing properly before distributing the feature to external users associated with customers (e.g., production ring(s)). However, in some cases, particular features may receive proportionately less usage in the internal rings than the customer usage reflected in the external rings. This disproportionately low usage of some features in the internal rings is a factor that can lead to weak telemetry data, which can allow code regressions (e.g., bugs) to go undetected until these features are released to the external rings and used by customers. Feature regressions in the external rings can cause customer service disruptions and/or a subpar customer experience, resulting in customer dissatisfaction with the software product.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In aspects, large-scale software providers may release or update features on a daily or weekly basis. Traditionally, when a feature is updated or a new feature is released, the feature undergoes "ring level validation," which refers to deploying the feature to internal rings (e.g., "dogfood rings") for testing and validation before distributing the feature to external rings (e.g., "production rings"). However, in some cases, particular features may receive proportionately less usage in the internal rings than the customer usage reflected in the external rings. This disproportionately low usage of some features in the internal rings can allow code regressions (e.g., bugs) to go undetected until the features are released to the external rings and used by customers. Feature regressions in the external rings can cause customer service disruptions and/or a subpar customer experience, resulting in customer dissatisfaction with the software product.

In order to address the issues identified above, the present systems and methods accelerate feature usage in the internal rings to match or mirror customer usage in the external rings. Features that are highly used by customers (e.g., top features) are dynamically identified based on a combination of a data driven approach, customer signals, and business input. Once the top features are identified, internal feature usage for those features may be evaluated and compared to the external usage. Top features for which internal feature usage is lacking, as well as an amount of internal feature usage needed to compensate for the deficiency, may be identified. Then, one or more tenant sites may be identified that are estimated to generate the amount of internal feature usage needed to meet the deficiency. These sites may be migrated internally from ring 1 to ring 0 or replicated (without accessing any tenant data) from a production ring (e.g., rings 2 or 3) onto rings 0 or 1. In this way, sites that exhibit heightened usage of the features and/or operations of interest may be used to generate additional internal feature usage. By increasing internal testing and validation, the stability and reliability of feature releases are increased, thereby improving customer experience and satisfaction with the software product. Thus, the present application addresses the issues of service interruptions and customer dissatisfaction associated with feature deployments associated with application services.

In aspects, a computer-implemented method of accelerating internal usage for features is provided. The method includes inspecting one or more external farms of a cloud computing environment to determine external usage for each of a plurality of features. The method further includes ranking the plurality of features in descending order based on external usage and, based on the ranking, identifying at least one high ranked feature. Additionally, the method includes determining internal usage for the high ranked feature and comparing the internal usage to the external usage of the high ranked feature. Based on the comparison, the method includes determining a deficiency of the internal usage for the high ranked feature. The method also includes evaluating one or more sites associated with the cloud computing environment to identify a site with a site usage corresponding to at least a portion of the deficiency of the internal usage and relocating the site onto an internal farm of the cloud computing environment.

In further aspects, a system is provided. The system includes a processor and memory storing computer-executable instructions that when executed by the processor cause the system to perform operations. The operations include inspecting one or more external farms of a cloud computing environment to determine external usage for each of a plurality of features and identifying at least one feature having high external usage, where the at least one feature comprises at least one operation. The operations further include decoupling the at least one operation from the at least one feature. Additionally, the operations include determining internal usage for the at least one feature and comparing the internal usage to the external usage of the at least one feature. Based on the comparison, the operations include determining a deficiency of the internal usage for the at least one feature and evaluating one or more sites associated with the cloud computing environment to identify a site with a site usage corresponding to at least a portion of the deficiency of the internal usage. The operations also include relocating the site onto an internal farm of the cloud computing environment.

In still further aspects, a computer storage medium is provided. The computer storage medium stores computer-executable instructions that when executed a processor cause a computer system to perform operations. The operations include inspecting one or more external farms of a cloud computing environment to determine external usage for each of a plurality of features and identifying at least one feature having high external usage, where the at least one feature comprises at least one operation. Additionally, the operations include determining internal usage for the at least one feature and comparing the internal usage to the external usage of the at least one feature. Based on the comparison, the operations include determining a deficiency of the internal usage for the at least one feature and evaluating one or more sites associated with the cloud computing environment to identify a site with a site usage corresponding to at least a portion of the deficiency of the internal usage. The operations also include relocating the site onto an internal farm of the cloud computing environment, deploying an update to the at least one feature to an internal ring of validation, and increasing internal usage of the update based on internal user interactions with the update on the relocated site.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Figure 1:
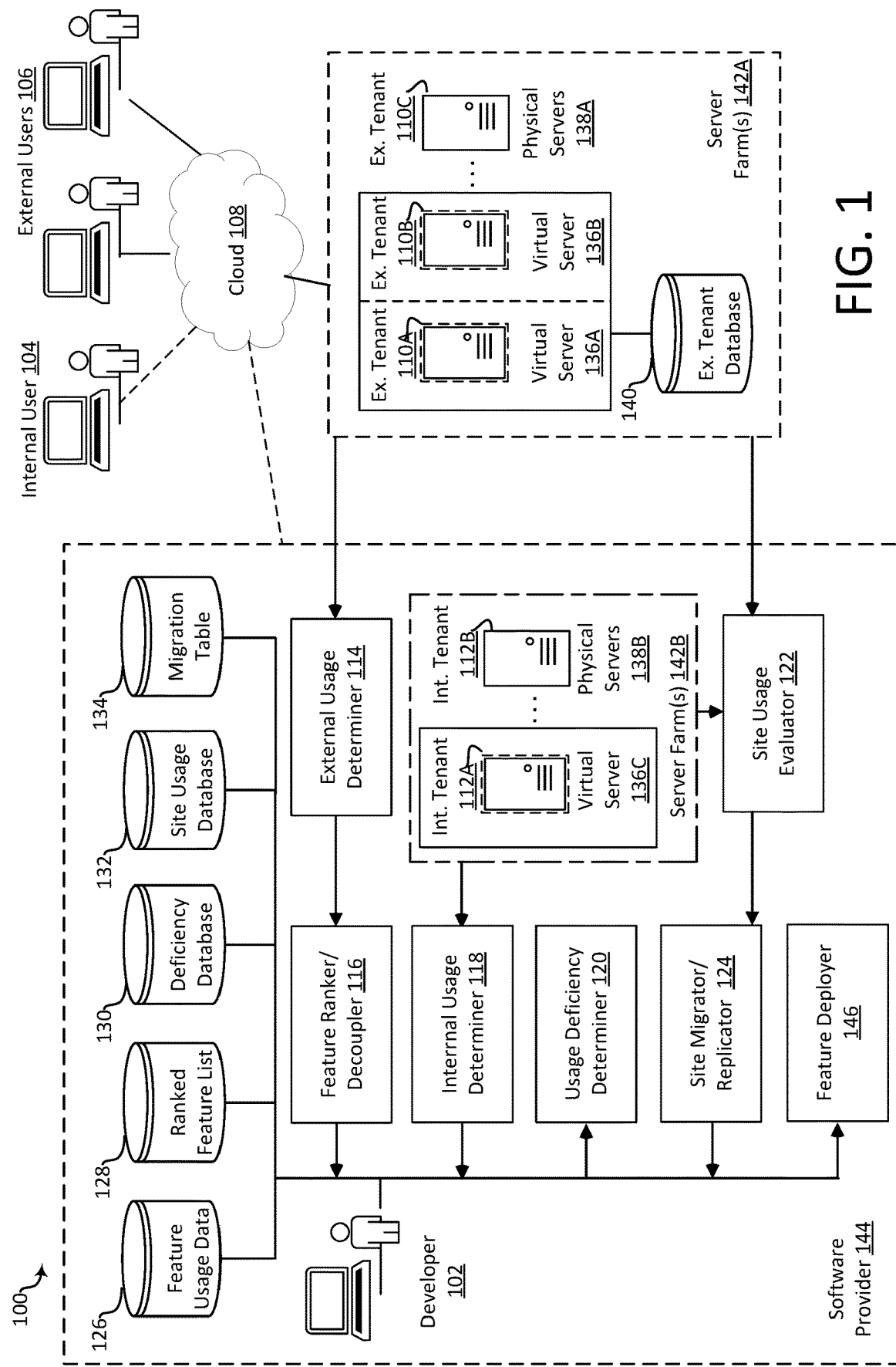
FIG. 1 illustrates an overview of an example system for accelerating pre-production feature usage in accordance with aspects of the present disclosure.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In aspects, large-scale software providers may release or update features on a daily or weekly basis. In aspects, a "feature" may be built on one or more operations (e.g., API calls) to enable end users to utilize the application services to upload files, create lists, share files, authenticate requests, create various parts of a portal page, etc. In aspects, large-scale software providers may release or update features on a daily or weekly basis. Traditionally, when a feature is updated or a new feature is released, the feature undergoes "ring level validation," which refers to deploying the feature to internal rings (e.g., "dogfood rings") for testing and validation before distributing the feature to external rings (e.g., "production rings"). However, in some cases, particular features may receive proportionately less usage in the internal rings than the customer usage reflected in the external rings. Using an analogy, consider an automobile manufacturer. If cars are test-driven in Alaska, it may appear that the cars are functioning properly but the air conditioning may never be used. Then, when the cars are sold to buyers in Arizona, it may be discovered that the air conditioning is defective. Similarly, disproportionately low usage of some features in the internal rings can allow code regressions (e.g., bugs) to go undetected until the features are released to the external rings and used by customers. Feature regressions in the external rings can cause customer service disruptions and/or a subpar customer experience, resulting in customer dissatisfaction with the software product.

In order to address the issues identified above, the present systems and methods accelerate feature usage in the internal rings to match or mirror customer usage in the external rings. Features that are highly used by customers (e.g., top features) are dynamically identified based on a combination of a data driven approach, customer signals, and business input. For instance, production farms (e.g. external farms) associated with the cloud computing environment may be inspected to identify external feature usage across all customer usage patterns for different segment groups (e.g., Financial, Travel, Education, Medical, Government, and the like). Once the top most-used features are identified, internal features usage for those features may be evaluated and compared to the external usage. Top features for which internal feature usage is lacking, as well as an amount of internal feature usage needed to compensate for the deficiency, may be identified.

Then, one or more internal and/or external tenant sites may be identified that are estimated to generate the amount of internal feature usage needed to meet the deficiency. In aspects, internal tenant sites may be migrated from ring 1 to ring 0 and external tenant sites may be replicated (without accessing any tenant data) onto ring 0. In this way, sites that exhibit heightened usage of the features and/or operations of interest may be used to generate additional internal feature usage (e.g., by focused internal user interactions and/or automated testing). Continuing with the analogy above, migrating and/or replicating sites exhibiting heightened feature usage to ring 0 is similar to shipping cars to a variety of different environments to ensure all of the components receive sufficient testing (e.g., to Seattle where windshield wipers will be used more frequently and to Arizona where the air conditioner will be used more frequently). Perhaps more similar, the manufacturer may replicate the environments of Seattle (e.g., rain simulations) and Arizona (e.g., heat simulations) to ensure all of the components receive sufficient testing.

As should be appreciated, accelerating feature usage in the internal rings to match or mirror customer usage in the external rings facilitates increased internal testing and validation. In this way, the issues of service disruptions and customer dissatisfaction associated with feature deployments are minimized, while the stability and reliability of feature releases are increased. Thereby, the present systems and methods improve customer experience and satisfaction with the software product.

FIG. 1 illustrates an overview of an example system for accelerating pre-production feature usage in accordance with aspects of the present disclosure. System 100 may represent a system for distributing program instructions to one or more tenants.

Developer 102 develops program instructions associated with new or updated features for application services hosted by a software provider 144 in a cloud computing environment 108. In some cases, developer 102 may initiate ring level validation for a new or updated feature. Ring level validation can be visualized as a concentric set of rings, with an increasing number of users in each ring. For instance, the rings may be numbered from 0 to 3, for example, with "ring 0" being the smallest ring and having the most focused regression testing (e.g., by a group of internal developers and users of a particular product). That is, although ring 0 may have a lower user count, this ring occurs earlier in the feature workflow (e.g., 48 hours earlier) and involves users who are highly familiar with the features and how they should perform (e.g., developers and/or engineers); as well, this ring involves automated testing in which virtual users may be created to target particular features and generate additional telemetry data. "Ring 1" is a larger ring including the ring 0 users and additional internal users (e.g., all internal users of a software provider). While the ring 0 users may have access to a feature that has been promoted (or validated) to ring 1, focused attention on the feature by the ring 0 users (and/or automated testing) may not be performed in ring 1. "Ring 2" is a larger ring including the internal users from rings 0 and 1 and at least some external users (e.g., customer users). Ring 2 may be associated with the "first production ring" in which the feature is released to external users. In some cases, the external users associated with ring 2 may be specially selected by the software provider to provide feedback regarding the product, including new and updated feature releases. "Ring 3" is the largest ring and may include providing access (or deploying) a new or updated feature to all internal and external users. Accordingly, in this exemplary scenario, ring 3 may represent the "last production ring." As should be appreciated, the above description of concentric rings is exemplary and more or fewer internal and/or external rings may be employed for ring level validation.

In aspects, telemetry data may be collected based on usage of a new or updated feature in each ring. Based on the telemetry data, for instance, regression testing may be conducted in each ring. "Regression testing" refers to the evaluation of data (e.g., telemetry data) to identify errors (e.g., regressions) in the code associated with a feature. "Telemetry data" refers to data collected based on user interactions with (or usage of) a feature. Thus, if feature usage is low, the telemetry data collected for that feature is also low. If telemetry data is lacking, regression testing is less likely to identify errors or performance issues with the feature. This is particularly troubling if features receive proportionately less usage in the internal rings than the customer usage that is reflected in the external rings. That is, due to the diversity of feature use cases, internal users may interact with a feature sparingly while external users (e.g., customers) may heavily use the feature. Due to this disproportionately low usage in the internal rings, code regressions (e.g., bugs) may go undetected until the features are released to the external rings and used by customers. Feature regressions in the external rings can cause customer service disruptions and/or a subpar customer experience, resulting in customer dissatisfaction with the software product.

Internal users 104 of the software provider use computing devices to access internal sites of the application services via cloud computing environment 108. As used herein, a "site" may refer to an internal or external tenant interface enabling user interactions with the application services. For instance, each internal user 104 of a plurality of internal users 104 may be associated with an internal tenant (e.g., internal tenants 112A-112B) and may access the application services via an internal site (or internal tenant interface) hosted by the software provider 144 on cloud computing environment 108. Similarly, external users 106 of the software provider use computing devices to access external sites of the application services via cloud computing environment 108. For instance, each external user 106 of a plurality of external users 106 may be associated with an external tenant (e.g., external tenants 110A-110C) and may access the application services via an external site (or external tenant interface) hosted by the software provider 144 on cloud computing environment 108.

Cloud computing environment 108 may comprise one or more resources, including one or more servers (e.g., comprising processing units and memory) and one or more databases communicatively coupled over a secure network. The cloud computing environment may be organized into one or more server farm(s) 142 containing one or more virtual servers 136A-136C and one or more physical servers 138A-138B. For example, virtual servers 136A-136C partitioned on one or more physical servers 138A-138B may provide the functionality (e.g., processing and memory) of a dedicated server to one or more internal or external tenants. For example, external tenant 110A may use virtual server 136A, external tenant 110B may use virtual server 136B, and internal tenant 112A may use virtual server 136C, for example. In aspects, various servers or server farms may primarily host either internal or external tenants. In other aspects, both internal and external tenants may be hosted on a server farm. In either case, whether internal and/or external tenants are hosted on a server or server farm, security measures (e.g., permissions policies, firewalls, memory partitioning, and the like) ensure that tenant data cannot be accessed by other tenants. Nor is external tenant data accessible to the software provider. For example, external tenant data may be stored in various databases (e.g., external tenant database 140) that are communicatively coupled to a virtual or physical server (e.g., virtual server 136A) hosting the corresponding tenant (e.g., external tenant 110A) but are inaccessible by virtual or physical servers hosting other tenants (e.g., external tenants 110B-110C, internal tenants 112A-112B) or the software provider 144.

Virtual servers 136A-136B and physical server 138A collectively form a server farm 122. In aspects, since virtual servers 136A-136B and physical server 138A host external tenants 110A-110C, server farm 142A may correspond to a "production farm" (e.g., "external farm"). Similarly, virtual server 136C and physical server 138B collectively form a server farm 142B. Since virtual server 136C and physical server 138B host internal tenants 112A-112B, server farm 142B may correspond to a "dogfood farm" (e.g., "internal farm"). In some aspects, e.g., to load balance resources of the cloud computing environment 108, internal and/or external tenants may be migrated to other servers and/or server farms. In this case, server farms that were previously dogfood farms may become production farms, and vice versa. Accordingly, server farms may be monitored and determined to be either production farms (e.g., external farms) or dogfood farms (e.g., internal farms) based on remaining in the same state for a period of time.

Memory associated with the respective virtual servers 136A-136C and physical servers 138A-138B may store program instructions (e.g., code) for execution by one or more Central Processing Units (CPUs), not shown in the figure. Execution of the program instructions makes features and component operations (e.g., API calls) available for use on internal sites by internal users 104 or on external sites by external users 106. New or updated program instructions (e.g., new or updated code) may be deployed and enabled to provide new or updated features on the internal and/or external sites. In aspects, based on ring level validation, new and/or updated features may be deployed first to internal users 104 accessing internal sites before deploying the new or updated features to external users 106 accessing external sites. In this way, the new and updated features may be tested internally first to identify and correct regressions and thereby prevent a negative customer experience and/or service outages for external users 106. When internal usage and testing is sufficient, server farm(s) 142A-142B can provide internal users 104 and external users 106 access to stable and reliable software products and services administered by software provider 144, such as uploading files, sharing files, authenticating requests, creating webparts, etc. In aspects, millions of users (including internal users 104 and external users 106) associated with hundreds of thousands of internal and external tenants (including internal tenants 112A-112B and external tenants 110A-110C) may access various application services made available through cloud computing environment 108.

To ensure sufficient internal usage and testing, external usage determiner 114 may dynamically identify features that are highly used by customers (e.g., top most-used features or "top features") based on a combination of a data driven approach, customer signals, and business input. As used herein, "feature usage" may be measured as a number of hits or user requests per day on a feature. As noted above, a feature may be built on one or more operations (e.g., API calls). Accordingly, feature usage may include the cumulative "operation usage" (e.g., number of hits or user requests per day) on the operations upon which the feature is built. In aspects, the data-driven approach may involve inspecting all production farms associated with the cloud computing environment to identify external usage across all customer usage patterns for different segment groups (e.g., Financial, Travel, Education, Medical, Government, and the like). In some cases, feature usage (and/or operation usage) may be represented as a median value across all production farms (or a representative production farm). In aspects, a "production farm" may be a server farm that hosts external tenants (or, a server farm that has hosted external tenants for a period of time). External usage determiner 114 may inspect production farms every 90 days, for example. Alternatively, such inspection may occur more or less frequently. Based on the inspection of production farms, external usage determiner 114 may determine external usage for each feature. Additionally, or alternatively, based on customer signals and/or business input, the external usage for some features may be weighted. For example, external usage may be weighted for features that are heavily used by key customers or for features that previously experienced regressions. In this way, external usage determiner 114 compiles and weights (in some cases) the external usage for each feature provided by the application services. In aspects, external usage data for each feature may be stored in feature usage database 126.

Upon external usage determiner 114 determining external usage (and applying any weighting factors) for each feature, feature ranker/decoupler 116 may rank the features in descending order by external usage. In this way, the top most-used features (e.g., top features) may be identified. After ranking the features, feature ranker 116 may identify a top set of features that are highly ranked, e.g., the top 10 features, the top 50 features, the top 100 features, or any other suitable number. In aspects, the ranking for each feature may be stored in ranked feature list 128. In other aspects, only the identified top features (e.g., top 10 features, top 20 features, etc.) may be stored in ranked feature list 128. Ranked feature list 128 may comprise a table, a database, or any other suitable data structure. In addition to identifying the top features, feature ranker/decoupler 116 may decouple (e.g., break down) the top features into smaller engineering components and/or API calls. As described above, top features may be associated with an "external usage" (e.g., number of hits or user requests per day on the feature) that includes the cumulative "operation usage" (e.g., number of hits or user requests per day on the operations upon which the feature is built). By decoupling the underlying operations from the top features, usage of complete features as well as usage of individual components on different sites may be evaluated.

Internal usage determiner 118 may determine internal usage for the top features identified by feature ranker/decoupler 116. Similar to external usage, internal usage may involve a number of hits or user requests per day on a feature. The number may be a median number of hits per day on the feature, for example. In aspects, internal usage may be evaluated based on feature usage by internal users in rings 0 and 1. In aspects, internal usage data for each feature may be stored in feature usage database 126. To provide adequate testing and validation of a top feature, internal usage may preferably correspond to a threshold fraction (or percentage) of external usage. A suitable fraction may be 1/10000th (e.g., 0.0001 or 0.01%) of external usage, 1/1000th (e.g., 0.001 or 0.1%) of external usage, 1/500th (e.g., 0.002 or 0.2%) of external usage, or another suitable fraction or percentage as determined by an implementation designer. As should be appreciated, the threshold fraction (or percentage) may represent sufficient internal usage such that the implementation designer may be reasonably confident that any regressions will be identified and corrected during internal ring validation. Thus, based on the particular feature, the threshold fraction may be higher or lower.

Usage deficiency determiner 120 may determine whether the internal usage for any of the top features does not meet the threshold fraction (or fraction) of the external usage. Additionally, for top features lacking sufficient internal usage, usage deficiency determiner 120 may determine an amount of internal usage needed to meet the threshold fraction. For instance, in an exemplary and non-limiting example, for a top feature having a median external usage of 10,000 hits per day and a threshold fraction of 0.1%, the median internal usage should be at least 10 hits per day. If median internal usage is only 6 hits per day, the deficiency in internal usage is 4 hits per day, which is the amount needed to meet the threshold fraction (or percentage). In aspects, deficiencies in internal usage for top features determined by usage deficiency determiner 120 may be stored in deficiency database 130.

Upon identification of top features that lack sufficient internal usage, site usage evaluator 122 may evaluate sites of internal and external tenants to identify sites exhibiting elevated usage for one or more top features (and/or their component operations). As noted above, a "site" may refer to an internal or external tenant interface enabling user interactions with (or requests on) the application services. In aspects, different sites may use features in differing amounts. For example, a Team Site may use "file uploading" and "file sharing" features heavily, while a News Site may mostly use "webpart rendering" features. Additionally or alternatively, different sites may use component operations of features in differing amounts.

Upon identifying sites with elevated usage of a top feature of interest (or component operations), site usage evaluator 122 may estimate a feature usage per day for each site. In this way, site usage evaluator 122 may identify one or more internal or external sites that are estimated to generate an amount of usage needed to meet the threshold fraction for at least one of the top features identified above by usage deficiency determiner 120. Usage data for internal or external sites may be mapped to particular features and/or component operations and stored in site usage database 132.

Upon identification of one or more internal or external sites estimated to generate an amount of usage needed to meet the threshold fraction for at least one of the top features, site migrator/replicator 124 may migrate or replicate the sites onto an internal ring. For instance, internal tenant sites may be migrated internally from ring 1 to ring 0. In this way, additional focused testing of the feature may be provided by internal developers/engineers and/or automated testing. Alternatively, external tenant sites may be replicated (without accessing any tenant data) from one of the production rings (e.g., rings 2 or 3) onto dogfood rings 0 or 1. That is, the interface (or infrastructure) of the external site may be replicated in the dogfood ring(s) such that internal users may interact with the feature of interest (or its underlying component operations). Data generated by site migrator/replicator 124 regarding migration of internal sites and/or replication of external sites into the dogfood rings may be stored in migration table 134. In this way, sites that exhibit heightened usage of the top features (and/or component operations) may be used to generate additional internal usage (e.g., by focused internal user interactions and/or automated testing). Additional telemetry data may be generated based on the additional internal usage of the top features. Based on the additional telemetry data, for instance, additional regression testing may be conducted to ensure that errors (e.g., regressions) are identified and corrected in the dogfood rings prior to releasing an update to a top feature (or a new feature similar to the top feature) to the production rings.

Feature deployer 146 may use the evaluations and determinations conducted by the modules described above when deploying a new or updated feature. For example, if an update is directed to one of the top features lacking sufficient internal usage identified above, one or more internal or external sites estimated to generate a sufficient amount of feature and/or operation usage may be identified from site usage database 132, for example. The identified sites may then be migrated or replicated within the dogfood rings to ensure that the update receives sufficient regression testing. Alternatively, if a new feature is being deployed, the new feature (or its underlying component operations) may be compared to top features lacking sufficient internal testing. If the new feature is similar to one of these top features (e.g., the new feature comprises 15 of the 20 component operations of the top feature), one or more internal or external sites estimated to generate a sufficient amount of feature and/or operation usage may be identified (e.g., from site usage database 132) and migrated or replicated within the dogfood rings to ensure that the new feature receives sufficient regression testing. In this way, feature regressions associated with new or updated feature releases may be minimized in the external rings, thereby preventing customer service disruptions and/or a subpar customer experience. Accordingly, customer satisfaction, trust, and loyalty for the application services may be increased.

As should be appreciated, the various methods, devices, applications, modules, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
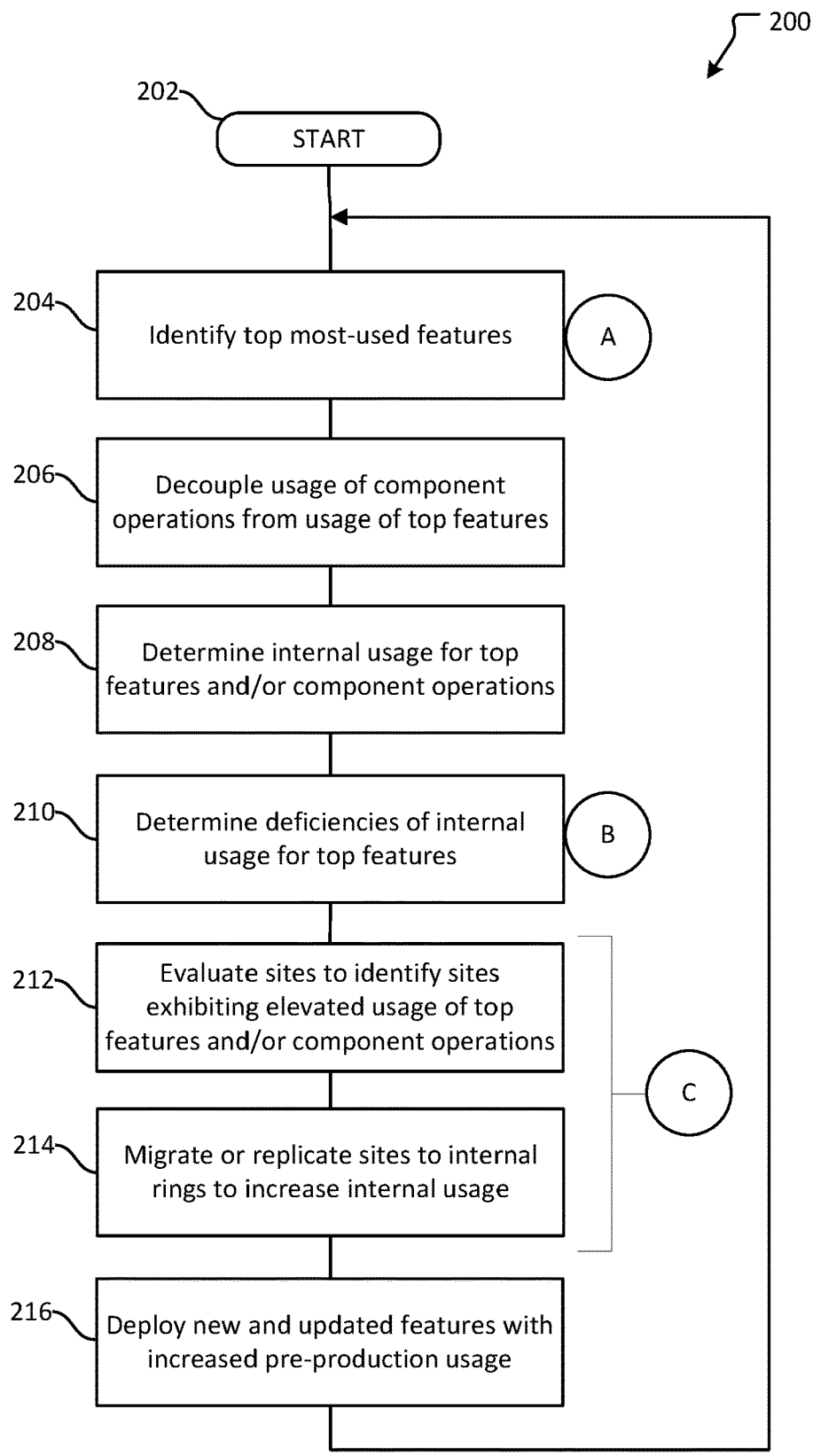
FIG. 2 illustrates an example method of accelerating pre-production feature usage in accordance with aspects of the present disclosure.

FIG. 2 illustrates an example method of accelerating pre-production feature usage in accordance with aspects of the present disclosure.

A general order of the operations for the method 200 is shown in FIG. 2. Generally, the method 200 begins with a start operation 202 and recurs after operation 216. In some cases, method 200 may recur every 90 days, or may recur more or less frequently. The method 200 may include more or fewer steps or may arrange the order of the steps differently than those shown in FIG. 2. The method 200 can be executed as a set of computer-executable instructions executed by a computer system and encoded or stored on a computer readable medium. Further, the method 200 can be performed by gates or circuits associated with a processor, an ASIC, an FPGA, a SOC or other hardware device. Hereinafter, the method 200 shall be explained with reference to the systems, components, devices, modules, software, data structures, data characteristic representations, signaling diagrams, methods, etc., described in conjunction with FIGS. 1, 3-7B.

At identify operation 204, top most-used features (e.g., top features) may be identified. To ensure sufficient internal usage and testing, features that are highly used by customers (e.g., top most-used features or "top features") may be dynamically identified based on a combination of a data driven approach, customer signals, and business input. In aspects, the data-driven approach may involve inspecting production farms associated with the cloud computing environment to identify external usage across customer usage patterns for different segment groups (e.g., Financial, Travel, Education, Medical, Government, and the like). As detailed above, a "production farm" may be a server farm that hosts external tenants (or, a server farm that has hosted external tenants for a period of time). For instance, a production farm may host external tenants associated with at least ring 2 of a ring level validation scheme. Ring 2 may be associated with the "first production ring" in which the feature is released to external users and may involve a smaller subset of external users than ring 3, which may involve deploying the feature to a larger set of external users. In some cases, the external users associated with ring 2 may be specially selected by the software provider to provide feedback regarding the product, including new and updated feature releases. In aspects, ring 3 may represent the largest set of external users and may be associated with the "last production ring." Based on the inspection of production farms, an external usage for each feature may be determined. Additionally, based on customer signals and/or business input, the external usage for some features may be weighted. For example, external usage may be weighted for features that are heavily used by key customers, features associated with seasonal usage, or features that previously experienced regressions. Upon determining external usage (and applying any weighting factors) for each feature, the features may be ranked in descending order by external usage. In this way, a top set of features (e.g., highest ranked features) may be identified, e.g., the top 10 features, the top 50 features, the top 100 features, or any other suitable number.

At decouple operation 206, operation usage of underlying component operations may be decoupled from the feature usage for the top features. For instance, the top features may be broken down into smaller engineering components and/or API calls. As described above, top features may be associated with an "external usage" (e.g., number of hits or user requests per day on the feature per day) that includes the cumulative "operation usage" (e.g., number of hits or user requests per day on the operations upon which the feature is built). By decoupling the underlying operations from the top features, external usage of complete features as well as operation usage of individual components on different sites may be evaluated.

At determine operation 208, internal usage for the top features and/or component operations may be determined. Similar to external usage, internal usage may involve a number of hits or user requests per day on a feature. In aspects, internal usage may be evaluated based on feature usage by internal users in rings 0 and 1. As noted above, ring 0 is the smallest ring and has the most focused regression testing (e.g., by a group of internal developers and users of a particular product). That is, although ring 0 may have a lower user count, this ring occurs earlier in the feature workflow (e.g., 48 hours earlier) and involves users who are highly familiar with the features and how they should perform (e.g., developers and/or engineers); as well, this ring involves automated testing in which virtual users may be created to target particular features and generate additional telemetry data. Ring 1 is a larger ring including the ring 0 users and additional internal users (e.g., all internal users of a software provider). While the ring 0 users may have access to a feature that has been promoted (or validated) to ring 1, focused attention on the feature by the ring 0 users (and/or automated testing) may not be performed in ring 1. Based on an evaluation of usage of top features by internal users, an internal usage for each top feature may be determined.

At determine deficiency operation 210, deficiencies in internal usage for the top features may be determined. For instance, to provide adequate testing and validation of a top feature, internal usage may preferably correspond to a threshold fraction (or percentage) of external usage. A suitable fraction may be 1/10000th (e.g., 0.0001 or 0.01%) of external usage, 1/1000th (e.g., 0.001 or 0.1%) of external usage, 1/500th (e.g., 0.002 or 0.2%) of external usage, or another suitable fraction or percentage as determined by an implementation designer. Based on the threshold fraction (or percentage) of external usage, it may be determined whether internal usage for any of the top features is deficient or lacking. Additionally, for top features lacking sufficient internal usage, an amount of internal usage needed to meet the threshold fraction may be determined. For instance, in an exemplary and non-limiting example, for a top feature having a median external usage of 10,000 hits per day and a threshold fraction of 0.1%, the median internal usage should be at least 10 hits per day. If median internal usage is only 6 hits per day, the deficiency is 4 hits per day.

At identify operation 212, one or more internal or external sites exhibiting elevated usage of top features (or component operations) may be identified. For instance, internal and external tenant sites may be evaluated to identify sites exhibiting elevated usage for one or more top features (and/or their component operations). As noted above, a "site" may refer to an internal or external tenant interface enabling hits or requests on the application services. In aspects, different sites may use features in differing amounts. For example, a Team Site may use "file uploading" and "file sharing" features heavily, while a News Site may mostly use "webpart rendering" features. Additionally or alternatively, different sites may use component operations of features in differing amounts. Upon identifying sites with elevated usage of a top feature of interest (or component operations), feature usage per day for each site may be estimated. In this way, one or more internal or external sites may be identified that are estimated to generate an amount of usage needed to meet the threshold fraction.

At migrate operation 214, the one or more internal or external sites exhibiting elevated usage of top features (or component operations) may be migrated or replicated to the internal rings (e.g. dogfood rings). For instance, internal tenant sites may be migrated internally from ring 1 to ring 0. In this way, additional focused testing of the feature may be provided by internal developers/engineers and/or automated testing. Alternatively, external tenant sites may be replicated (without accessing any tenant data) from one of the production rings (e.g., rings 2 or 3) onto dogfood rings 0 or 1. That is, the interface (or infrastructure) of the external site may be replicated in the dogfood ring(s) such that internal users may interact with a feature of interest (or its underlying component operations). In this way, sites that exhibit heightened usage of the top features (and/or component operations) may be used to generate additional internal usage (e.g., by focused internal user interactions and/or automated testing). Additional telemetry data may be generated based on the additional internal usage of the feature. Based on the additional telemetry data, for instance, additional regression testing may be conducted to ensure that errors (e.g., regressions) are identified and corrected in the dogfood rings prior to releasing an update to the feature (or a new feature similar to the feature) to the production rings.

At deploy operation 216, a new or updated feature may be deployed. For example, if an update is directed to one of the top features lacking sufficient internal usage identified above, one or more internal or external sites estimated to generate a sufficient amount of feature and/or operation usage may be identified. The identified sites may then be migrated or replicated within the dogfood rings to ensure that the update receives sufficient regression testing. Alternatively, if a new feature is being deployed, the new feature (or its underlying component operations) may be compared to top features lacking sufficient internal testing. If the new feature is similar to one of these top features (e.g., the new feature comprises 15 of the 20 component operations of the top feature), one or more internal or external sites estimated to generate a sufficient amount of feature and/or operation usage may be identified. The identified sites may then be migrated or replicated within the dogfood rings to ensure that the new feature receives sufficient regression testing. In this way, pre-production usage may be accelerated to minimize feature regressions associated with new or updated feature releases in the external rings, thereby preventing customer service disruptions and/or a subpar customer experience. Accordingly, customer satisfaction, trust, and loyalty for the application services may be increased.

Figure 3:
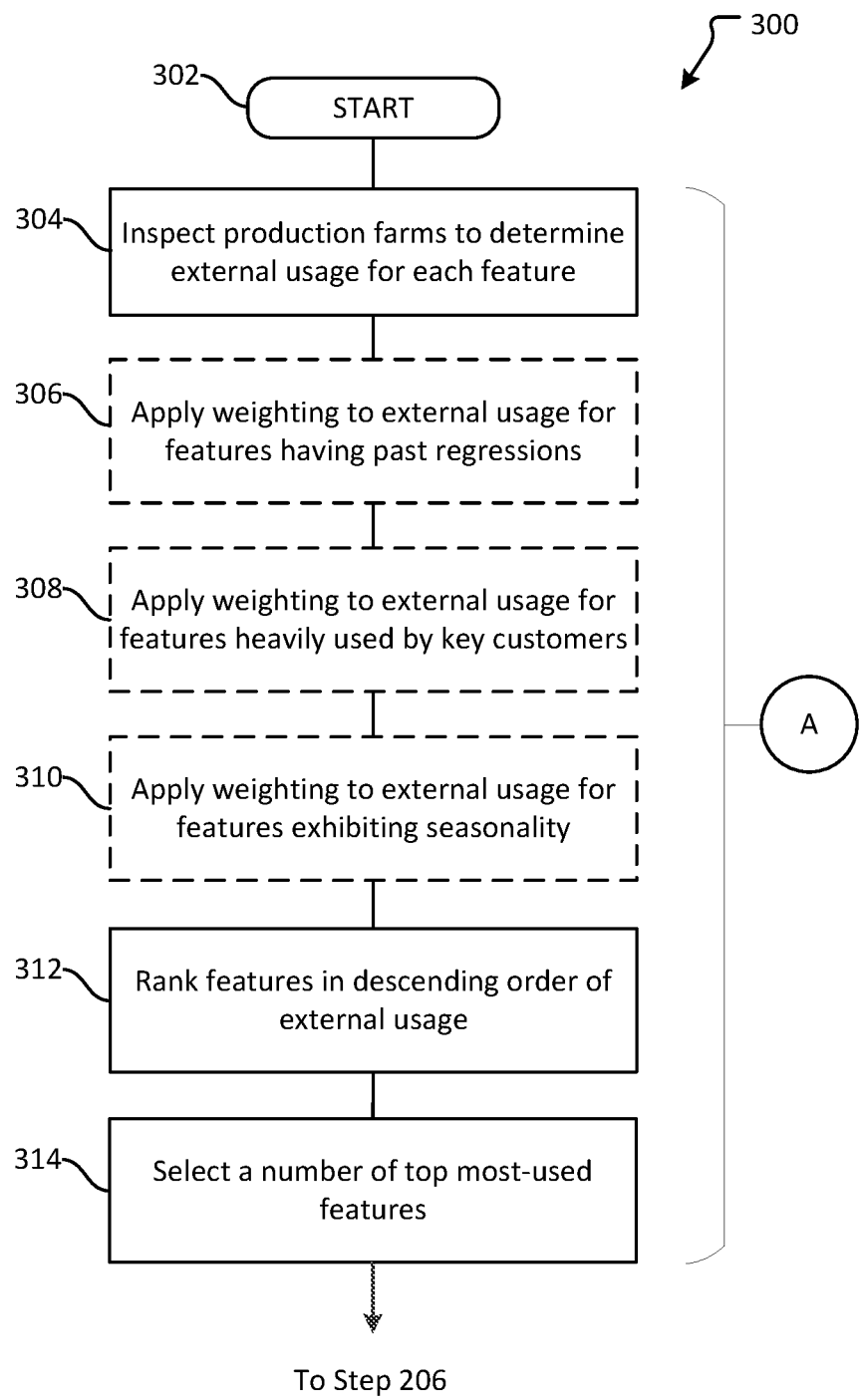
FIG. 3 illustrates an example method of identifying top features in accordance with aspects of the present disclosure.
Figure 4:
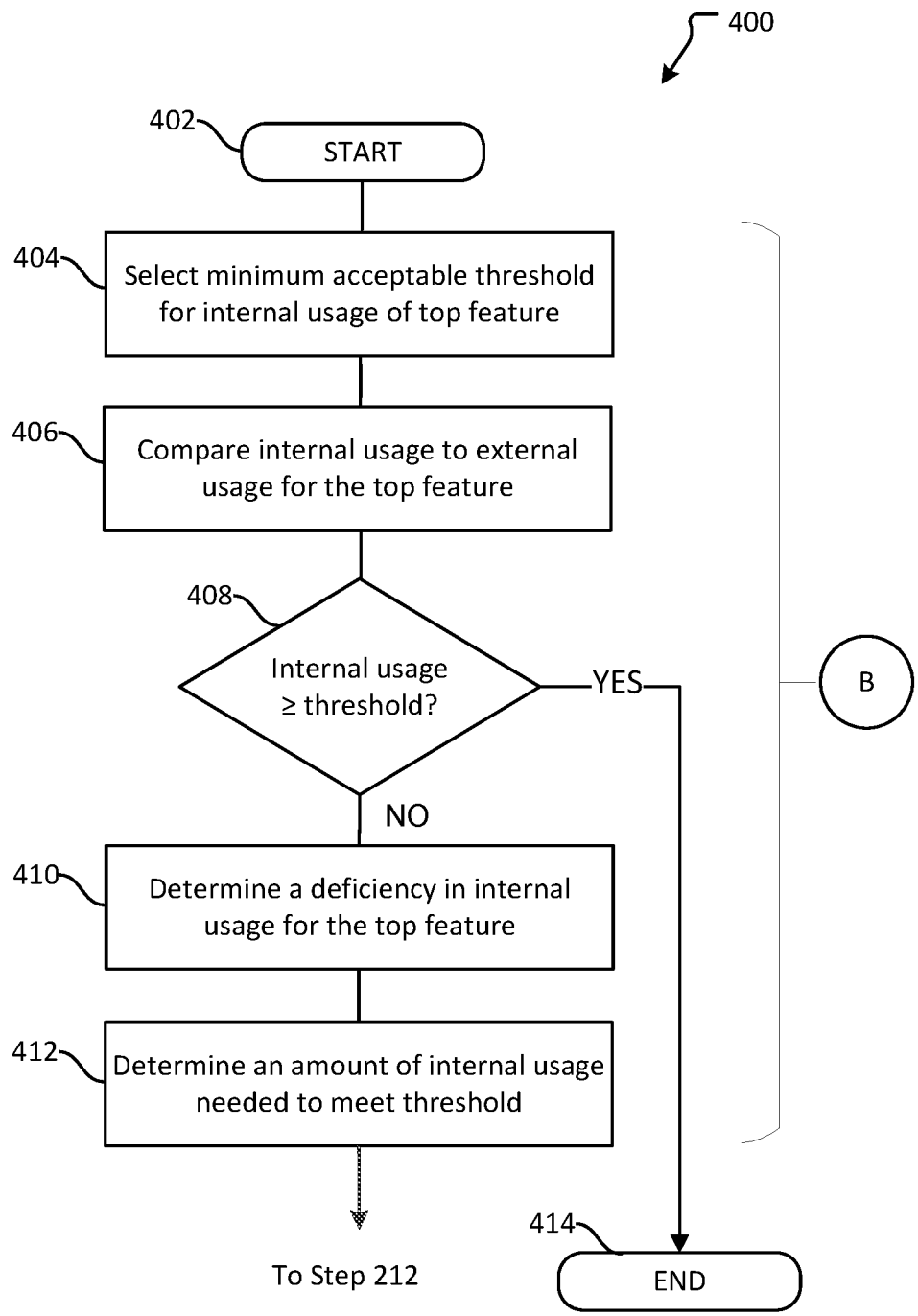
FIG. 4 illustrates an example method of determining top features that lack sufficient internal testing in accordance with aspects of the present disclosure.
Figure 5:
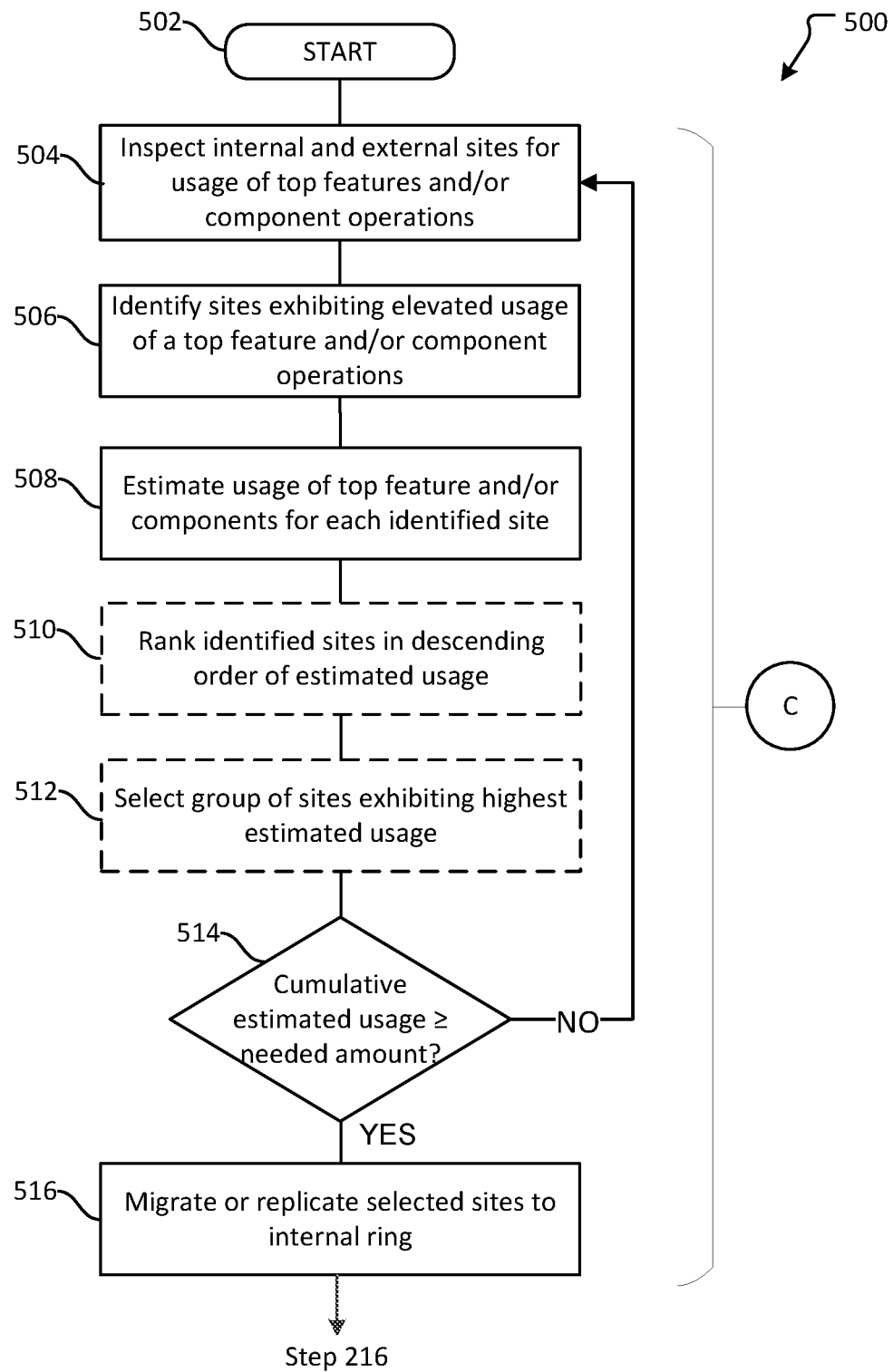
FIG. 5 illustrates an example method of identifying and migrating sites exhibiting elevated usage of top features in accordance with aspects of the present disclosure.

In aspects, identify operation 214 is detailed further with respect to FIG. 3 (as indicated by "A"), determine deficiency operation 210 is detailed further with respect to FIG. 4 (as indicated by "B"), and identify operation 212 and migrate operation 214 are detailed further with respect to FIG. 5 (as indicated by "C").

As should be appreciated, operations 202-216 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

FIG. 3 illustrates an example method of identifying top features in accordance with aspects of the present disclosure.

A general order of the operations for the method 300 is shown in FIG. 3. Generally, the method 300 begins with a start operation 302 and illustrates a sequence of operations for identify operation 204 of FIG. 2. The method 300 may include more or fewer steps or may arrange the order of the steps differently than those shown in FIG. 3. The method 300 can be executed as a set of computer-executable instructions executed by a computer system and encoded or stored on a computer readable medium. Further, the method 300 can be performed by gates or circuits associated with a processor, an ASIC, an FPGA, a SOC or other hardware device. Hereinafter, the method 300 shall be explained with reference to the systems, components, devices, modules, software, data structures, data characteristic representations, signaling diagrams, methods, etc., described in conjunction with FIGS. 1-2, 4-7B.

At inspect operation 304, one or more production farms may be inspected to determine external usage for one or more features. As used herein, "feature usage" may be measured as a number of hits or user requests per day on a feature. As noted above, a feature may be built on one or more operations (e.g., API calls). Accordingly, feature usage may include the cumulative "operation usage" (e.g., number of hits or user requests per day) on the operations upon which the feature is built. In aspects, the data-driven approach may involve inspecting one or more production farms associated with the cloud computing environment to identify external feature usage across customer usage patterns for different segment groups (e.g., Financial, Travel, Education, Medical, Government, and the like). In aspects, a "production farm" may be a server farm that hosts external tenants (or, a server farm that has hosted external tenants for a period of time). For instance, a production farm may host external tenants associated with at least ring 2 of a ring level validation scheme. In some cases, all production farms across the cloud computing environment may be inspected; in other cases, some subset of production farms may be inspected.

Based on the inspection of production farms, average production farms may be identified that host average tenants (e.g., tenants with average requests per second, RPS, on the application services). In aspects, inspection of production farms may occur every 90 days, or may occur more or less frequently. In some cases in which asymmetrical seasonal usage patterns are not statistically relevant, a median external usage may be identified for each feature based on usage by external users on an average production farm over a 90 day period. In other cases, a mean external usage may be identified for each feature based on usage by external users on an average production farm over a 90 day period. The features may then be organized in descending order based on the median (or mean) external usage (hereinafter, "external usage"). In some aspects, all features and component operations may be evaluated for external usage; in other aspects, most of the features and component operations may be evaluated for external usage; in still other aspects, some subset of features and component operations may be evaluated for external usage.

At optional apply weight operation 306, a first weighting may be applied to the external usage for some features determined at inspect operation 304. For instance, some features may have been associated with past regressions that led to negative customer experiences and/or service outages (e.g., as identified in customer complaints, health review reports, monthly service review reports, field engineer reports, technical account manager reports, refunds based on inadequate quality of service, and the like). The external usage for features with past regressions may be weighted (e.g., increased by some factor). The factor may be fixed or may be increased or decreased based on the number of past regressions, for instance. In some aspects, external usage for a feature with more past regressions may be weighted more heavily than a feature with less past regressions.

At optional apply weight operation 308, a second weighting may be applied to the external usage for some features determined at inspect operation 304. For instance, some features may be heavily used by key customers. Key customers may be customers that are strategic partners, customers with a threshold level of RPS, customers with a threshold number of active users, customers with special service agreements, and the like. The external usage for features used heavily by key customers may be weighted (e.g., increased by some factor). The factor may be fixed or may be based on a key customer level, for instance. In this way, external feature usage for a feature that is heavily used by a "white glove" customer (e.g., VIP or strategic partners) may be weighted more heavily than a feature that is heavily used by a customer meeting the thresholds for RPS or active users, for example.

At optional apply weight operation 310, a third weighting may be applied to the external usage for some features determined at inspect operation 304. For instance, some features may be heavily used by a particular segment group that exhibits seasonality. The external usage for features exhibiting seasonal usage may be weighted. For instance, if a feature is heavily used by the education sector, a weighting may be applied if the 90 day inspection period does not reflect the seasonal usage (e.g., the 90 day period falls during the summer). Additionally or alternatively, if a feature is heavily used by the financial sector, a weighting may be applied if the 90 day inspection period does not reflect the seasonal usage (e.g., the 90 day period falls outside of financial year-end). As should be appreciated, one or a combination of the optional apply weight operations 306, 308, or 310 may be performed to weight the external usage for a feature. Alternatively, none of the optional apply weight operations 306, 308, or 310 may be performed to weight the external usage for a feature.

At rank operation 312, upon determining external usage (and applying any weighting factors) for each feature, the features may be ranked in descending order by external usage.

At select operation 314, a set of top features (e.g., highest ranked features) may be identified. In aspects, the set of top features may represent the most-used features of the application services. For instance, the top 10 features, the top 20 features, the top 50 features, the top 100 features, or any other suitable number of features may be selected. Upon selecting the set of top features, the method may progress to determine attribute operation 206 of FIG. 2.

As should be appreciated, operations 302-314 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 4 illustrates an example method of determining top features that lack sufficient internal testing in accordance with aspects of the present disclosure.

A general order of the operations for the method 400 is shown in FIG. 4. Generally, the method 400 begins with a start operation 402 and illustrates a sequence of operations for determine deficiency operation 210 of FIG. 2. The method 400 may include more or fewer steps or may arrange the order of the steps differently than those shown in FIG. 4. The method 400 can be executed as a set of computer-executable instructions executed by a computer system and encoded or stored on a computer readable medium. Further, the method 400 can be performed by gates or circuits associated with a processor, an ASIC, an FPGA, a SOC or other hardware device. Hereinafter, the method 400 shall be explained with reference to the systems, components, devices, modules, software, data structures, data characteristic representations, signaling diagrams, methods, etc., described in conjunction with FIGS. 1-3, 5-7B.

At select operation 404, a minimum acceptable threshold for internal usage for each top feature of the set of top features may be selected. For instance, to provide adequate testing and validation of a top feature, internal usage may preferably correspond to a threshold fraction (or percentage) of external usage. A suitable fraction may be $\frac{1}{10000}$th (e.g., 0.0001 or 0.01%) of external usage, $\frac{1}{1000}$th (e.g., 0.001 or 0.1%) of external usage, $\frac{1}{500}$th (e.g., 0.002 or 0.2%) of external usage, or another suitable fraction or percentage as determined by an implementation designer. As should be appreciated, the threshold fraction (or percentage) may represent sufficient internal usage such that the implementation designer may be reasonably confident that any regressions will be identified and corrected during internal ring validation. Thus, the selected threshold may be specific to a particular top feature, and thus, the selected threshold for a first top feature may be higher or lower than the selected threshold for a second top feature.

At compare operation 406, internal usage for a top feature may be compared to the external usage for the top feature to determine whether the internal usage meets the selected threshold. For instance, the internal usage may be divided by the external usage to determine a fraction of internal usage to external usage for the top feature. In other examples, the fraction may be converted to a percentage of internal usage to external usage for the top feature.

At determination operation 408, the fraction (or percentage) of internal usage may be compared to the selected threshold. If the fraction (or percentage) of internal usage is greater than or equal to the selected threshold, it may be determined that the top feature has sufficient internal usage and the method may progress to end operation 414. If the fraction (or percentage) of internal usage is less than the selected threshold, it may be determined that the top feature lacks sufficient internal usage and the method may progress to determine deficiency operation 410.

At determine deficiency operation 410, in response to determining that the fraction (or percentage) of internal usage is less than the selected threshold, a deficiency in internal usage for the top feature may be determined. For instance, in an exemplary and non-limiting example, for a top feature having an external usage of 10,000 hits per day and a selected threshold of 0.1%, the internal usage should be at least 10 hits per day. If internal usage is only 6 hits per day, a deficiency in internal usage of 4 hits per day may be determined.

At determine amount operation 412, an amount of internal usage needed to meet the selected threshold for the top feature may be determined. Continuing with the exemplary and non-limiting example above, for a top feature having an external usage of 10,000 hits per day and a selected threshold of 0.1%, the internal usage should be at least 10 hits per day. If internal usage is only 6 hits per day, the amount of internal usage needed to meet the selected threshold is 4 hits per day (i.e., the deficiency). Upon determining the amount needed to meet the selected threshold for the top feature, the method may progress to identify operation 212 of FIG. 2.

As should be appreciated, operations 402-414 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 5 illustrates an example method of identifying and migrating sites exhibiting elevated usage of top features in accordance with aspects of the present disclosure.

A general order of the operations for the method 500 is shown in FIG. 5. Generally, the method 500 begins with a start operation 502 and illustrates a sequence of operations for identify operation 212 and migrate operation 214 of FIG. 2. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1-4, 6-7B.

At inspect operation 504, internal and/or external tenant sites may be inspected for feature usage of a top feature lacking sufficient internal usage, as determined by determine deficiency operation 210 of FIG. 2 and/or method 400 of FIG. 4. As noted above, a "site" may refer to an internal or external tenant interface enabling user interactions with (or requests on) the application services. Similar to internal and external usage, site usage may correspond to a number of hits or user requests per day on the top feature on the site (or a number of hits or user requests per day on component operations of the top feature on the site).

At identify site operation 506, one or more internal and/or external tenant sites may be identified that exhibit elevated usage of a top feature (or component operations). In aspects, different sites may use features in differing amounts. For example, a Team Site may use "file uploading" and "file sharing" features heavily, while a News Site may mostly use "webpart rendering" features. Additionally or alternatively, different sites may use component operations of features in differing amounts. In some cases, site usage for the various internal and/or external tenant sites may be compared to a threshold usage to determine elevated usage for a top feature. For instance, site usage may be elevated when the site usage exceeds a threshold usage of 50 hits per day, or 100 hits per day, etc., on the top feature (or component operations of the top feature).

At estimate operation 508, upon identifying sites with elevated usage of a top feature, an amount of site usage per day for the top feature (or component operations) may be estimated for each identified site (e.g., "estimated site usage"). For example, the estimated site usage may be based on a median or mean site usage per day for the top feature (or component operations) over a period of time (e.g., 90 days or some other suitable period).

At optional rank operation 510, the identified sites may be ranked in descending order of estimated site usage for the top feature (or component operations of the top feature).

At optional select operation 512, based on the ranking, a group of identified sites exhibiting the highest site usage for the top feature may be selected. In this way, the group of identified sites may represent the smallest number of identified sites estimated to generate the amount of usage needed to meet the selected threshold for the top features. In other aspects, identified sites may be selected individually when estimated site usage exceeds a threshold, for example.

At determination operation 514, it may be determined whether a cumulative estimated usage for the selected group of identified sites (or the individually selected sites) is greater than or equal to an amount of internal usage needed to meet the selected threshold of internal usage for the top feature (e.g., based on select operation 404 of FIG. 4). Cumulative estimated usage may comprise a sum of the estimated site usage for each identified site in the selected group of identified sites (or for each of the individually selected sites). If the cumulative estimated usage is greater than or equal to the needed amount, the method may progress to migrate operation 516. If the cumulative estimated usage is less than the needed amount, the method may return to inspect operation 504.

At migrate operation 516, the selected group of identified sites (or the individually selected sites) may be migrated or replicated to the internal rings (e.g. dogfood rings). For instance, internal sites may be migrated internally from ring 1 to ring 0. In this way, additional focused testing of the top feature (or component operations) may be provided by internal developers/engineers and/or automated testing. Alternatively, external sites may be replicated (without accessing any tenant data) from one of the production rings (e.g., rings 2 or 3) onto dogfood rings 0 or 1. That is, the interface (or infrastructure) of the external site may be replicated in the dogfood ring(s) such that internal users may interact with the top feature (or its underlying component operations). In this way, the selected group of identified sites (or the individually selected sites) may be used to generate additional internal usage of the top feature (e.g., by focused internal user interactions and/or automated testing). Additional telemetry data may be generated based on the additional internal usage of the top feature. Based on the additional telemetry data, for instance, additional regression testing may be conducted to ensure that errors (e.g., regressions) are identified and corrected in the dogfood rings prior to releasing an update to the top feature (or a new feature similar to the top feature) to the production rings. Upon migrating or replicating the selected group of sites, the method may progress to deploy operation 216 of FIG. 2.

As should be appreciated, operations 502-516 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 6:
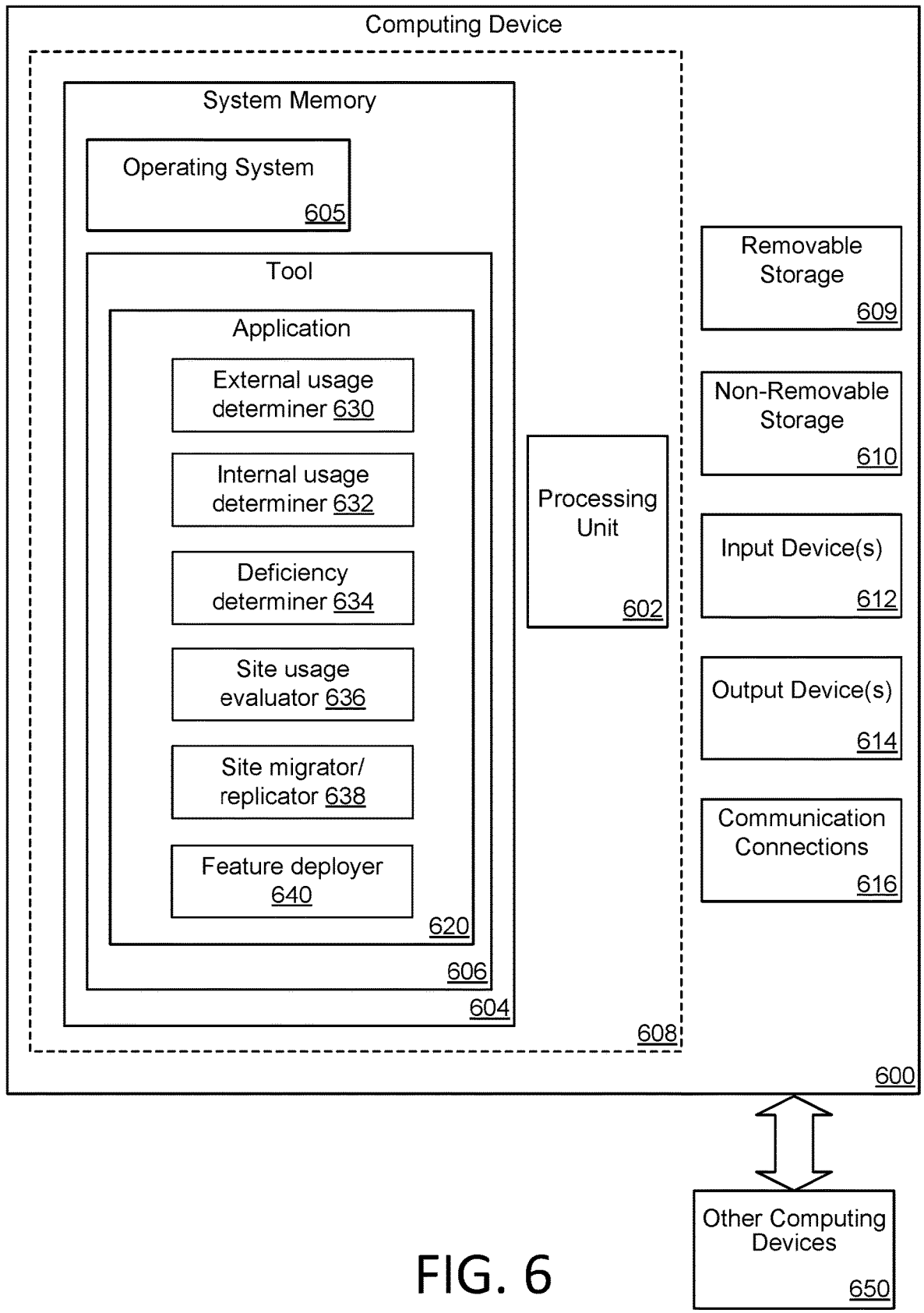
FIG. 6 is a block diagram illustrating physical components (e.g., hardware) of a computing device 600 with which aspects of the disclosure may be practiced.

FIG. 6 is a block diagram illustrating physical components (e.g., hardware) of a computing device 600 with which aspects of the disclosure may be practiced.

The computing device components described below may be suitable for the computing devices described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program tools 606 suitable for performing the various aspects disclosed herein such. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program tools and data files may be stored in the system memory 604. While executing on the processing unit 602, the program tools 606 (e.g., an application 620) may perform processes including, but not limited to, the aspects, as described herein. The application 620 includes external usage determiner 630, internal usage determiner 632, deficiency determiner 634, site usage evaluator 636, site migrator/replicator 638, and feature deployer 640, as described in more detail with regard to FIG. 1.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 600 may also have one or more input device(s) 612, such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
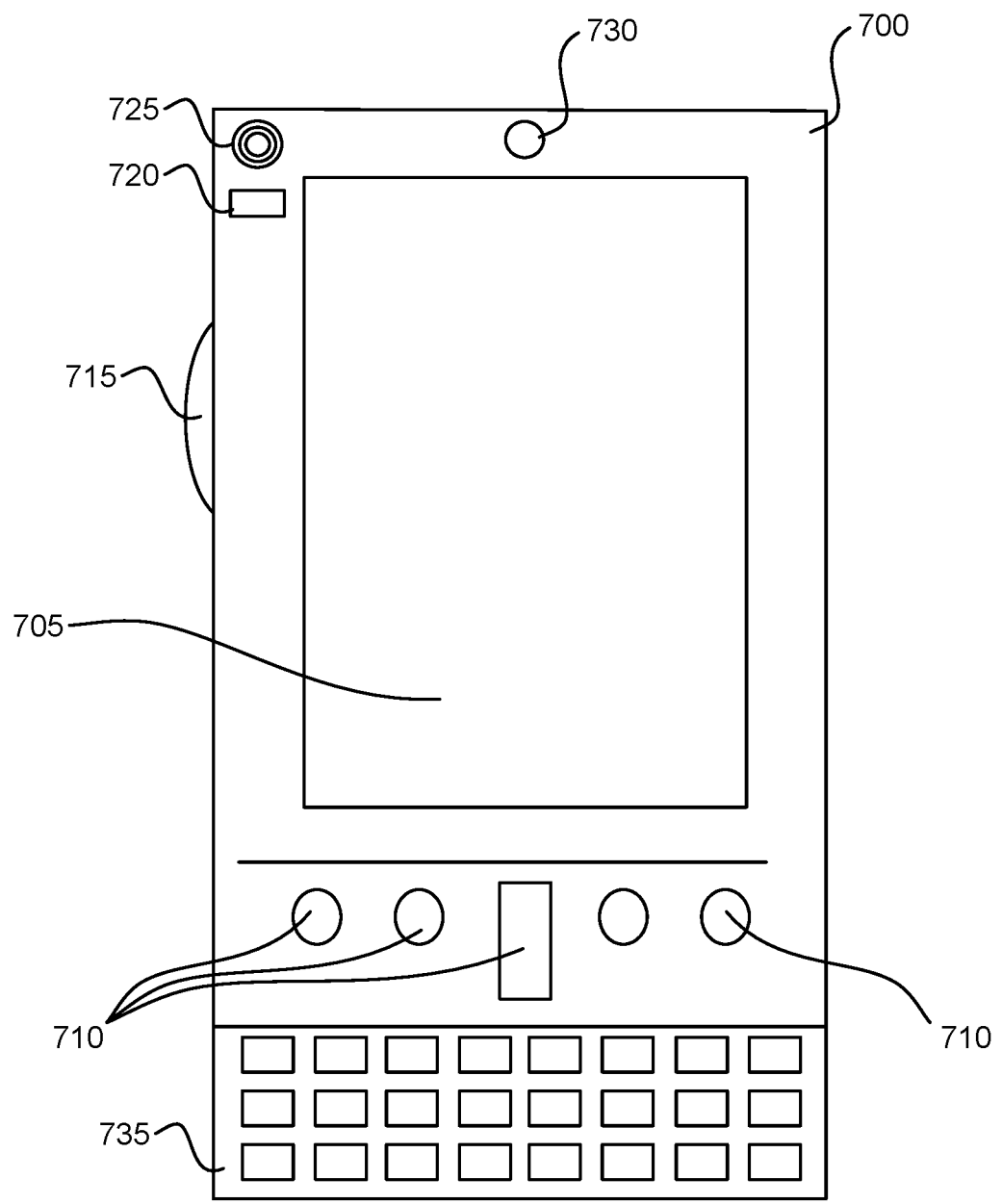
FIG. 7A is a simplified diagram of a mobile computing device with which aspects of the present disclosure may be practiced.
Figure 7B:
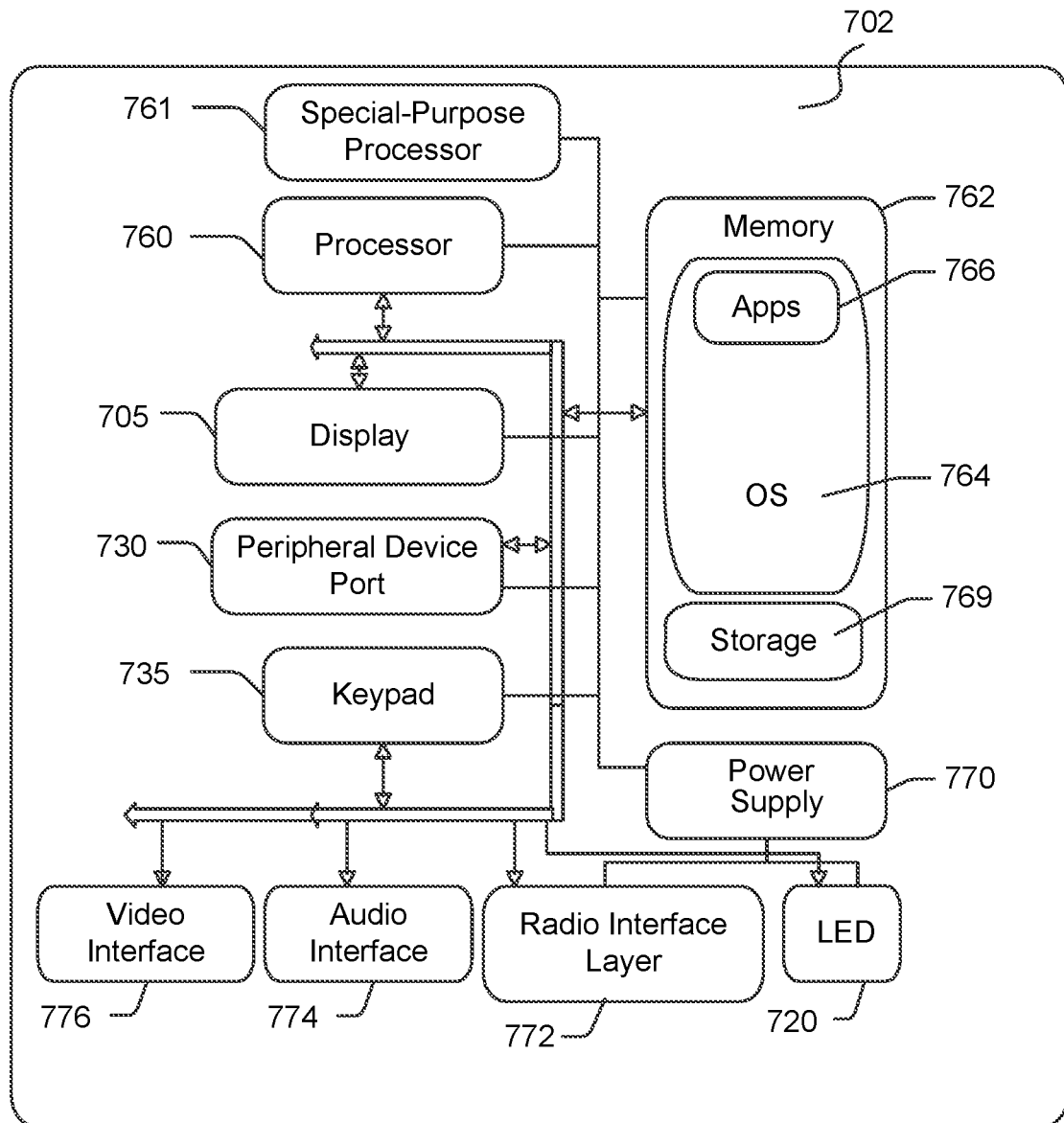
FIG. 7B is another simplified block diagram of a mobile computing device with which aspects of the present disclosure may be practiced.

FIGS. 7A and 7B illustrate a computing device or mobile computing device 700, for example, a mobile telephone, a smart phone, wearable computer (such as a smart watch), a tablet computer, a laptop computer, and the like, with which aspects of the disclosure may be practiced. In some aspects, the client (e.g., computing devices of end users 104 in FIG. 1) may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some aspects. In yet another alternative aspect, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 720 (e.g., a light emitting diode), and/or an audio transducer (e.g., a speaker, not shown). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of computing device, a server, a mobile computing device, etc. That is, the computing device 700 can incorporate a system 702 (additionally or alternatively an architecture) to implement some aspects. The system 702 can implemented as a "smart phone" capable of running one or more applications (e.g., browser, e-mail, calendaring, contact managers, messaging clients, games, and media clients/players). In some aspects, the system 702 is integrated as a computing device, such as an integrated digital assistant (PDA) and wireless phone.

One or more application programs 766 may be loaded into the memory 762 and run on or in association with the operating system 764. Examples of the application programs include phone dialer programs, e-mail programs, information management (PIM) programs, word processing programs, spreadsheet programs, Internet browser programs, messaging programs, and so forth. The system 702 also includes a non-volatile storage area 769 within the memory 762. The non-volatile storage area 769 may be used to store persistent information that should not be lost if the system 702 is powered down. The application programs 766 may use and store information in the non-volatile storage area 769, such as e-mail or other messages used by an e-mail application, and the like. A synchronization application (not shown) also resides on the system 702 and is programmed to interact with a corresponding synchronization application resident on a host computer to keep the information stored in the non-volatile storage area 769 synchronized with corresponding information stored at the host computer. As should be appreciated, other applications may be loaded into the memory 762 and run on the mobile computing device 700 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer (e.g., speaker, not shown)). In the illustrated configuration, the visual indicator 720 is a light emitting diode (LED). These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer (e.g., speaker), the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 769.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method of accelerating internal usage for features, the method comprising:
   determining external usage for each of a plurality of features in one or more external farms of a cloud computing environment;
   ranking the plurality of features in descending order based on external usage for each of the plurality of features;
   based on the ranking, identifying at least one high ranked feature from the plurality of features;
   determining internal usage for the at least one high ranked feature in one or more internal farms of the cloud computing environment;
   comparing the internal usage for the at least one high ranked feature to the external usage of the at least one high ranked feature;
   based on the comparison, determining whether there is a deficiency of the internal usage for the at least one high ranked feature compared to the external usage for the at least one high ranked feature, the deficiency indicating a usage difference for the at least one high ranked feature between the internal usage and the external usage;
   in response to determining that there is the deficiency of the internal usage for the at least one high ranked feature, determining a site with a site usage corresponding to at least a portion of the usage difference for the at least one high ranked feature by evaluating one or more sites of one or more internal tenants and one or more external tenants of the one or more internal farms and the one or more external farms, respectively; and
   migrating or replicating the site onto at least one internal farm of the one or more internal farms of the cloud computing environment to compensate for the deficiency of the internal usage.

2. The computer-implemented method of claim 1, wherein the migrating or replicating the site onto the at least one internal farm further includes:
   deploying an update to the at least one high ranked feature to one or more internal users for an internal validation; and
   migrating or replicating the site onto the at least one internal farm to increase internal usage of the update based on internal user interactions with the update on the site.

3. The computer-implemented method of claim 1, wherein the migrating or replicating the site onto the at least one internal farm further includes:
   deploying a new feature to one or more internal users for an internal validation, wherein the new feature includes a predetermined number of component operations of the at least one high ranked feature; and
   migrating or replicating the site onto the at least one internal farm to increase internal usage of the new feature based on internal user interactions with the new feature on the site.

4. The computer-implemented method of claim 1, wherein the at least one high ranked feature comprises at least one operation, the method further comprising:
   decoupling the at least one operation from the at least one high ranked feature.

5. The computer-implemented method of claim 4, wherein decoupling the at least one operation from the at least one high ranked feature comprises decoupling an operation usage of the at least one operation from the external usage of the at least one high ranked feature.

6. The computer-implemented method of claim 1, wherein the site comprises an internal tenant site of the one or more internal tenants of the cloud computing environment, and wherein the internal tenant site comprises an internal tenant interface enabling internal user interactions with application services.

7. The computer-implemented method of claim 6, wherein migrating or replicating the site comprises migrating the internal tenant site onto the internal farm.

8. The computer-implemented method of claim 7, wherein migrating the internal tenant site onto the internal farm enables internal user interactions with the at least one high ranked feature.

9. The computer-implemented method of claim 1, wherein the site comprises an external tenant site of the one or more external tenants of the cloud computing environment, and wherein the external tenant site comprises an external tenant interface enabling external user interactions with application services.

10. The computer-implemented method of claim 9, wherein migrating or replicating the site comprises replicating the external tenant site onto the one or more internal farm.

11. The computer-implemented method of claim 10, wherein replicating the external tenant site onto the one or more internal farm enables internal user interactions with the at least one high ranked feature.

12. A system, comprising:
at least one processor; and
at least one memory storing computer-executable instructions that when executed by the at least one processor cause the system to:
determine external usage for each of a plurality of features in one or more external farms of a cloud computing environment;
identify at least one feature having high external usage, wherein the at least one feature comprises at least one operation;
decouple the at least one operation from the at least one feature;
determine internal usage for the at least one feature in one or more internal farms of the cloud computing environment;
compare the internal usage to the external usage of the at least one feature;
based on the comparison, determine whether there is a deficiency of the internal usage for the at least one feature, the deficiency indicating a usage difference between the internal usage and the external usage for the at least one feature;
in response to determination that there is the deficiency of the internal usage for the at least one high ranked feature, determine a site with a site usage corresponding to at least a portion of the usage difference for the at least one feature by evaluating one or more sites of one or more internal tenants and one or more external tenants of the one or more internal farms and the one or more external farms, respectively; and
migrate or replicate the site onto at least one internal farm of the one or more internal farms of the cloud computing environment to compensate for the deficiency of the internal usage.

13. The system of claim 12, wherein to migrate or replicate the site onto the at least one internal farm further includes:
deploy an update to the at least one feature to one or more internal users for an internal validation; and
migrate or replicate the site onto the at least one internal farm to increase internal usage of the update based on internal user interactions with the update on the site.

14. The system of claim 12, wherein to migrate or replicate the site onto the at least one internal farm further includes:
deploy a new feature to one or more internal users for an internal validation, wherein the new feature includes a predetermined number of component operations of the at least one feature; and
migrate or replicate the site onto the at least one internal farm to increase internal usage of the new feature based on internal user interactions with the new feature on the site.

15. The system of claim 12, wherein to decouple the at least one operation from the at least one feature comprises to decouple an operation usage of the at least one operation from the external usage of the at least one feature.

16. A computer storage medium storing computer-executable instructions that when executed a processor cause a computer system to:
external usage for each of a plurality of features in one or more external farms of a cloud computing environment;
identify at least one feature having high external usage, wherein the at least one feature comprises at least one operation;
determine internal usage for the at least one feature in one or more internal farms of the cloud computing environment;
compare the internal usage to the external usage of the at least one feature;
based on the comparison, determine whether there is a deficiency of the internal usage for the at least one feature, the deficiency indicating a usage difference between the internal usage and the external usage for the at least one feature;
in response to determining that there is the deficiency of the internal usage for the at least one high ranked feature, determine a site with a site usage corresponding to at least a portion of the usage difference for the at least one feature by evaluating one or more sites of one or more internal tenants and one or more external tenants of the one or more internal farms and the one or more external farms, respectively;
migrate or replicate the site onto at least one internal farm of the one or more internal farms of the cloud computing environment to compensate for the deficiency of the internal usage;
deploy an update to the at least one feature to one or more internal users for an internal validation; and
migrate or replicate the site onto the at least one internal farm to increase internal usage of the update based on internal user interactions with the update on the site.

17. The computer storage medium of claim 16, the computer-executable instructions when executed further causing the computer system to:
deploy a new feature to one or more internal users for an internal validation, wherein the new feature includes a predetermined number of component operations of the at least one feature; and migrate or replicate the site onto the at least one internal farm to increase internal usage of the new feature based on internal user interactions with the new feature on the site.

* * * * *